Oct. 16, 1951     H. J. LEVER     2,571,902
GLASS WASHER
Filed March 31, 1947
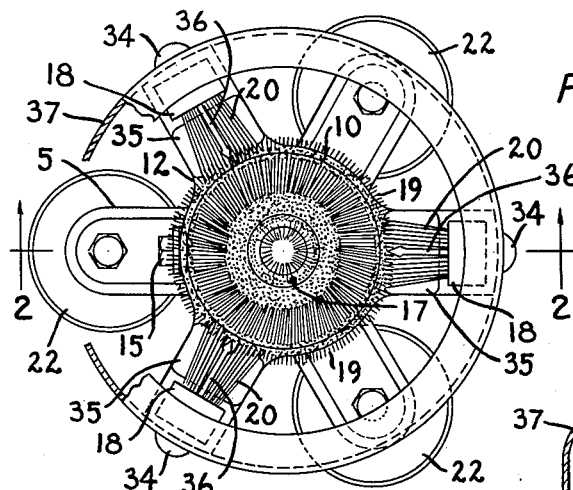
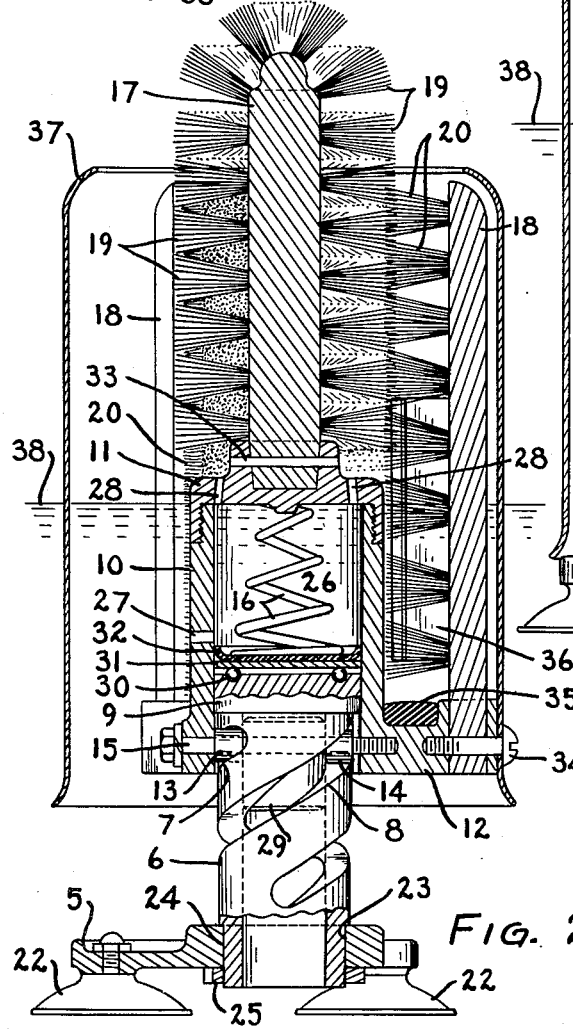
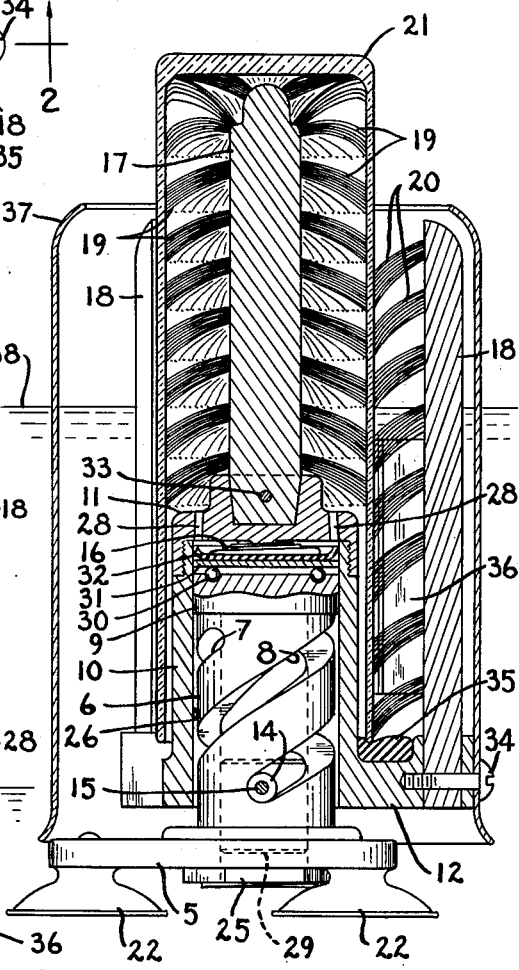
INVENTOR.
Harry J. Lever
BY Lieber & Lieber
ATTORNEYS Patented Oct. 16, 1951

2,571,902

UNITED STATES PATENT OFFICE 2,571,902

GLASS WASHER

Harry J. Lever, Racine, Wis.

Application March 31, 1947, Serial No. 738,279

4 Claims. (Cl. 15—76)

My present invention relates generally to improvements in the art of washing tubular articles, and relates more particularly to improvements in the construction and operation of portable and manually operable drinking glass washers.

A primary object of the present invention is to provide a new and useful glass washer which is simple, compact and durable in construction and which is moreover highly efficient and practical in operation.

It is a more specific object of this invention to provide an improved portable glass washer which is operable to thoroughly spray and scrub a drinking glass or the like when the glass is simply pressed downwardly in inverted position upon the central brush element of the washer.

Another specific object of the invention is to provide an improved mechanical drinking glass washer which is especially adapted for use in taverns, diners, restaurants and the like, and which may be readily operated by a novice without utilization of electrical power or the like.

Another specific object of my invention is to provide an improved portable unit for effectively washing and scrubbing glassware, and which has a plurality of brush elements cooperable with the interior and exterior of a glass and rotatable upon application of downward pressure thereto.

Another specific object of my present invention is to provide an improved portable glass washing unit which is adapted to supply cleaning fluid to the scrubbing zones during the scrubbing operation, and in which one or more wiping elements or squeegees are operable with the brushes to thoroughly cleanse and remove foreign substances from the glass.

A further specific object of the present invention is to provide an improved semi-automatic drinking glass washer which may be utilized in any sink, basin, or the like for efficiently washing drinking glasses, tumblers, and tubular articles of diverse sizes and shapes with minimum danger of breakage.

Still another specific object of the present invention is to provide an improved and extremely useful drinking glass washer which is composed of relatively few parts which may be readily manufactured and assembled at low cost.

An additional specific object of the present invention is to provide an improved portable drinking glass washer assemblage which may be quickly and easily dismantled and reassembled and in which all parts are conveniently accessible for inspection and repair.

These and other specific objects and advantages of the improvement will be apparent from the following detailed description.

A clear conception of the features constituting my present improvement, and of the mode of constructing and of utilizing glass washers embodying my invention, may be had by referring to the drawing accompanying and forming a part of this specification, wherein like reference characters designate the same or similar parts in the several views.

Fig. 1 is a top view of a glass washer embodying my invention, a portion of the casing being broken away to more clearly reveal structural details;

Fig. 2 is a transverse vertical section through the assemblage, taken along the line 2—2 of Fig. 1; and Fig. 3 is a similar transverse vertical section through the device showing the parts in compressed condition with a typical drinking glass in position for the scrubbing operation, one of the outer brush elements having been brought into the plane of the drawing for the sake of clarity and disclosure.

While the invention has been shown and described herein as being embodied in and particularly applicable to portable washing units for tumbler type glasses and especially adaptable for use in taverns and restaurants and the like, it is not my desire or intention to thereby unnecessarily limit the scope or utility of the improvement by virtue of such limited disclosure.

Referring to the drawing, my improved glass washer comprises, in general, a substantially flat base 5; a tubular upright central column 6 carried by the base 5 and having a pair of oppositely alined helical grooves 7, 8 therein, the column 6 also being provided with a piston or plunger 9 at the upper extremity thereof; a cylinder 10 slidably cooperable with the piston 9 and having an upper end closure 11 and a lower spider 12, the spider 12 having a pair of rollers 13, 14 secured thereto by means of a transversely extending bolt or pin 15 and coacting with the helical grooves 7, 8 respectively in the upright column; a helical compression spring 16 interposed between the piston 9 and end closure 11 of the cylinder 10, the spring 16 constantly tending to spread the piston 9 and cylinder end head 11 apart to normally maintain the rollers 13, 14 at the upper end of their respective grooves 7, 8; a central elongated and vertically disposed brush 17 secured to the upper end head 11 of the cylinder 10; and an annular series of vertical outer brushes 18 each secured to one of the arms of the cylinder spider 12, the brushes 17, 18 having reversely directed bristles 19, 20 respectively adapted to cooperate respectively with the internal and external surfaces of a drinking glass 21 or the like when applied thereto in inverted position as shown in Fig. 3.

The base 5 may be formed as a spider to conserve materials, and each arm of the base 5 is preferably provided with a rubber suction cup 22 of the usual well-known type to enable proper positioning of the assemblage. To rigidly secure the column 6 to the base 5 in a simple manner, the base 5 may be formed with a central aperture 23 adapted to snugly receive the reduced end portion 24 of the column 6, the portion 24 being externally threaded at the extreme end thereof to receive a lock nut 25 or the like.

Obviously, the piston 9 is slidable longitudinally within the chamber 26 of the cylinder 10 to serve as a pump upon vertical movement of the cylinder 10 and compression and expansion of the spring 16 due to application and removal of downward pressure on the cylinder 10 as will be hereinafter more fully described, the cylinder 10 being provided with one or more inlet ports 27 in the side wall thereof and one or more upwardly directed outlet ports 28 in the end head 11; and the pin 15 is also preferably provided with a guide block or bearing 29 carried between the rollers 13, 14 and slidably cooperable with the inner wall of the column 6 during vertical rotary movement of the cylinder 10 relative to the column 6. To minimize resistance to relative rotary movement between the piston 9 and spring 16, the piston face may be grooved and provided with an annular series of ball bearings 30 cooperable with a plate 31 carrying a cup-shaped sealing gasket or washer 32 or the like upon which the lower coil of the spring 16 is seated; and the coiled compression spring 16 is preferably of conical shape so that the coils will seat within each other in compressed condition as shown in Fig. 3, thereby providing for maximum vertical movement of the cylinder 10.

The central upright brush 17 may be attached to the cylinder end head 11 in any suitable manner as by a pin 33; and the outer brushes 18 may be attached to the arms of the spider 12 by screws 34 or the like. The brush 17 should be of sufficient length to receive drinking glasses 21 of various sizes, and each arm of the cylinder spider 12 is preferably provided with an upper pad 35 of rubber or the like to protect the rim of extremely tall glasses from breakage upon contact therewith. To aid in the removal of lipstick or the like from the glasses 21, each of the brushes 18 may be provided with an inwardly directed wiping element or rubber squeegee strip 36 adapted to contact the outer surface of the glass 21 adjacent the rim thereof; and to confine the wash water and minimize splashing during use of the device, an outer open-ended casing 37 or the like may be provided and this casing or jacket 37 may be conveniently secured to the arms of the spider 12 together with the brushes 18.

In actual use, the improved glass washer is partially immersed in a supply of wash water 38, the level of which should preferably be just below the cylinder end head 11 and between the inlet port 27 and outlet ports 38 so that the cylinder chamber 26 fills with wash water admitted through the port 27 when the parts are in normal inoperative position as shown in Fig. 2. The device may be secured in position within the receptacle containing the water supply 38 in an obvious manner by means of the suction cups 22, and is immediately ready for use. When it is desired to wash a dirty drinking glass 21, it is only necessary to place the glass in inverted position upon the central brush 17 and apply downward pressure thereto while gripping the glass to prevent rotation thereof. If the glass 21 is relatively short, the inner surface of the bottom of the glass will bear directly against the brush 17 and the pressure exerted upon the glass will be transmitted to the cylinder 10 through the brush 17; but if the glass 21 is longer than the combined length of the brush 17 and cylinder 10, the downward pressure will be transmitted to the cylinder 10 through the arms of its spider 12 with the rim of the glass 21 bearing upon the pad 35 as shown in Fig. 3. Application of downward pressure upon the cylinder 10 causes compression of the spring 16 and simultaneous downward movement of the rollers 13, 14 in their respective grooves 7, 8 of the column 6. Since the rollers 13, 14 are carried by the cylinder spider 12 and the grooves 7, 8 in which the respective rollers 13, 14 are caused to travel are alined and of helical formation, movement of the rollers 13, 14 causes the cylinder 10 and the brushes 17, 18 carried thereby to rotate relative to the glass 21 during vertical movement with the bristles 19, 20 of the brushes in contact with the inner and outer surfaces respectively of the glass 21 and with the wiper strips 36 in contact with the outer surface of the glass adjacent the lip contacting rim thereof. Simultaneously with this scrubbing and wiping action, the pump formed by the cylinder 10 and piston 9 functions to supply wash water to the bristles 19 and the inner surface of the glass 21, the piston 9 forcing water under pressure in the form of a spray from within the cylinder chamber 26 through the outlet ports 28 during compression of the spring 16 and movement of the cylinder 10 relative to the piston 9.

Upon release of downward pressure and upward withdrawal of the glass 21, the spring 16 expands within the chamber 26 causing movement of the cylinder 10 upwardly with respect to the base 5 and column 6 with the rollers 13, 14 travelling in their respective grooves 7, 8. Obviously, the above-described scrubbing and wiping action continues until the glass 21 has been fully withdrawn from the central brush 17 and/or the rollers 13, 14 are at the uppermost end of their respective grooves 7, 8. With the parts again expanded and the piston 9 at the lower end of the cylinder 10, a fresh supply of wash water 38 is admitted to the chamber 26 through the inlet port 27 and the glass washer is ready for another operation.

From the foregoing detailed description, it is apparent that my present invention provides an improved new and useful glass washer which is simple, compact, and durable in construction and which may be readily utilized to effectively wash drinking glasses of diverse sizes and styles. The various parts of the improved unit may be readily formed of any suitable non-corrosive and wear-resistant material, and several of the parts, including the brushes 17, 18, are in fact being formed of plastic. The parts may be produced in large quantities and at relatively low cost and the washers may be quickly and easily assembled either with or without the casing 37. The oppositely directed bristles 19, 20 of the brushes 17, 18 respectively should be relatively stiff for effective scrubbing results and the free ends thereof should preferably slightly overlap as shown; and while the device has been shown as having three outer brushes 18, any desired number of these brushes may of course be provided. For most desirable results, the combined length of the brush 17 and cylinder 10 should be greater than the depth of a standard drinking glass so that the bottom of the glass will ordinarily bear on the upper end of the central brush 17 during actual use and the lip contacting rim of the glass will not be placed under pressure. Devices embodying my invention are portable and may be readily moved from place to place; and they have proven highly practical and efficient in actual use. The improved washer may be readily utilized by a novice without necessity of utilizing electrical power, and dirty glasses may be quickly cleansed by one simple operation. All parts of the improved portable assemblage are conveniently accessible for inspection and repair or replacement, and the drinking glass washed thereby is protected from possible damage.

It should be understood that it is not desired to limit this invention to the exact details of construction or to the precise mode of application herein shown and described, for various modifications within the scope of the appended claims may occur to persons skilled in the art to which this invention pertains.

I claim:

1. A glass washer comprising, a base, a helically grooved column projecting upwardly from the central portion of said base, a piston carried at the upper extremity of said column, a cylinder slidably embracing said piston and having an upper closure head, means carried by the lower end of said cylinder below said piston and cooperable with the groove in said column for supporting said cylinder and for rotating the same relative to said column and said base upon axial movement of said cylinder, means within said cylinder and cooperating with said piston and said closure head for constantly urging the same apart, an upwardly projecting inner brush carried by said closure head for movement by said cylinder and adapted for disposition within an inverted glass, and an upwardly projecting outer brush carried by said cylinder for movement therewith and having bristles adapted to coact with the outer wall of an inverted glass disposed over said inner brush, said cylinder having a lower liquid inlet port and its upper closure head having an upwardly projecting liquid outlet port for directing a jet of liquid upwardly along said inner brush upon axial downward movement of said cylinder.

2. A glass washer comprising, a base, a helically grooved stationary column projecting upwardly from the central portion of said base, a piston carried at the upper extremity of said column, a cylinder slidably embracing said piston and having an upper closure head, means carried by the lower end of said cylinder below said piston and cooperable with the groove in said column for supporting said cylinder and for rotating the same relative to said column and said base upon axial movement of said cylinder, a compression spring housed within said cylinder and cooperating with said piston and said closure head for constantly urging the same apart, an upwardly projecting inner brush carried by said closure head for movement with said cylinder and adapted for disposition within an inverted glass, and an upwardly projecting annular series of outer brushes carried by said cylinder for movement therewith and having bristles adapted to coact with the outer wall of an inverted glass disposed over said inner brush, said cylinder having a lower liquid inlet port and its upper closure head having upwardly projecting liquid outlet ports for directing jets of liquid upwardly along said inner brush upon axial downward movement of said cylinder.

3. A glass washer comprising, a base, a helically grooved stationary column projecting upwardly from the central portion of said base, a piston carried at the upper extremity of said column, a cylinder slidably embracing said piston and having an upper closure head and lower outwardly directed lugs, means carried by the lower end of said cylinder below said piston and cooperable with the groove in said column for supporting said cylinder and for rotating the same relative to said column and said base upon axial movement of said cylinder, a helical spiral compression spring housed within said cylinder and coacting at one end with said piston and at the other end with said closure head for constantly urging the same apart, a central upwardly projecting inner brush carried by said closure head for movement with said cylinder and adapted for disposition within an inverted glass, and an upwardly projecting annular series of outer brushes secured at their lower ends to the outer ends of the lugs of said cylinder for movement therewith and having bristles adapted to coact with the outer wall of an inverted glass disposed over said inner brush, said cylinder having a lower liquid inlet port and its upper closure head having upwardly projecting liquid outlet ports for directing jets of liquid upwardly along said inner brush upon axial downward movement of said cylinder.

4. A glass washer comprising, a base, a helically grooved stationary column projecting upwardly from the central portion of said base, a piston carried at the upper extremity of said column, a cylinder slidably embracing said piston and having an upper closure head, means carried by the lower end of said cylinder below said piston and cooperable with the groove in said column for supporting said cylinder and for rotating the same relative to said column and said base upon axial movement of said cylinder, a compression spring housed within said cylinder and cooperating with said piston and said closure head for constantly urging the same apart, an upwardly projecting inner brush carried by said closure head for movement with said cylinder and adapted for disposition within an inverted glass, an upwardly projecting annular series of outer brushes carried by said cylinder for movement therewith and having bristles adapted to coact with the outer wall of an inverted glass disposed over said inner brush, and an elongated flexible wiper carried by each of said outer brushes and extending throughout extensive lower portions thereof and toward said inner brush, said cylinder having a lower liquid inlet port and its upper closure head having an annular series of upwardly directed liquid outlet ports for directing jets of liquid upwardly along said inner brush upon axial downward movement of said cylinder.

HARRY J. LEVER.

REFERENCES CITED

The following references are of record in the file of this patent:

UNITED STATES PATENTS

| Number | Name | Date |
| --- | --- | --- |
| 1,369,261 | Nelson | Feb. 22, 1921 |
| 1,603,288 | Nakis | Oct. 19, 1926 |
| 1,706,189 | Schmidt | Mar. 19, 1929 |
| 1,706,302 | Leavy | Mar. 19, 1929 |
| 1,921,509 | De Forest | Aug. 8, 1933 |
| 2,150,511 | Markwood | Mar. 14, 1939 |

FOREIGN PATENTS

| Number | Country | Date |
| --- | --- | --- |
| 64,682 | Switzerland | May 31, 1913 |
| 422,973 | Germany | Dec. 19, 1925 |
| 341,210 | Great Britain | Jan. 15, 1931 |